Feb. 18, 1969  E. M. REDDING  3,427,970
METHOD OF PRODUCING MOLDED PRINTING PLATES
Filed Sept. 19, 1966
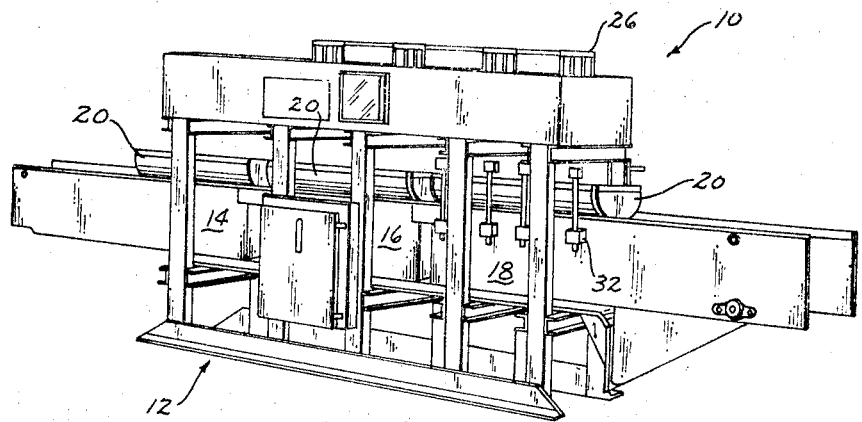
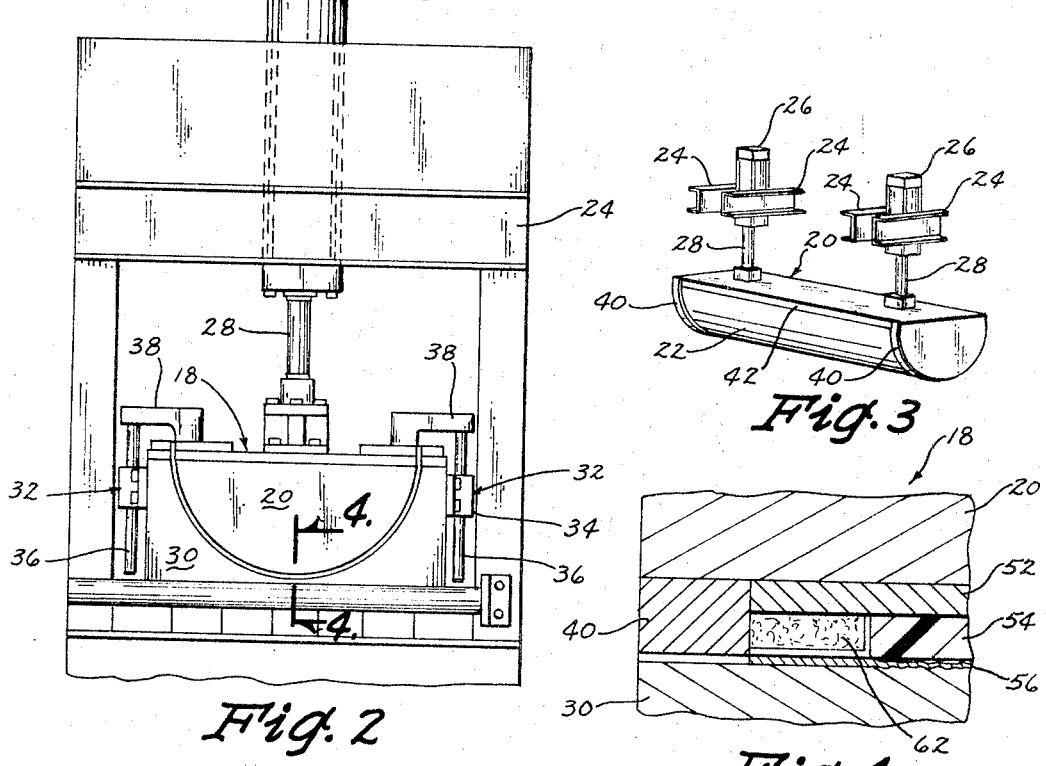
INVENTOR
EDWARD M. REDDING
BY
Dich, Zarley, McKee & Thomte
ATTORNEYS

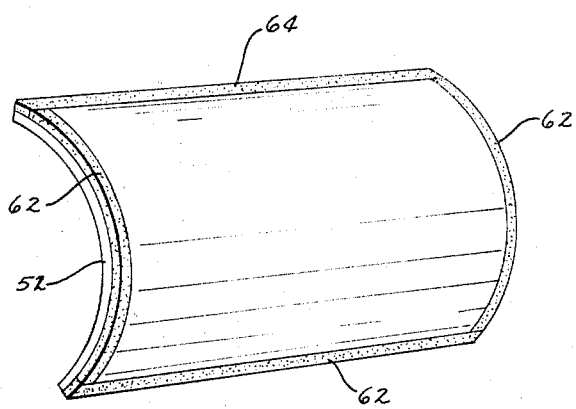
Fig. 6
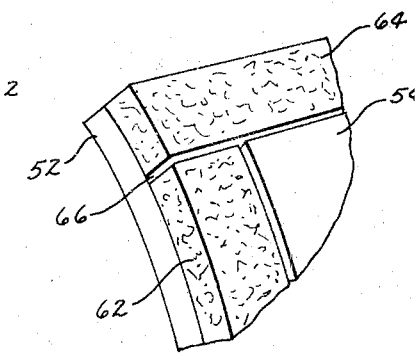
Fig. 7
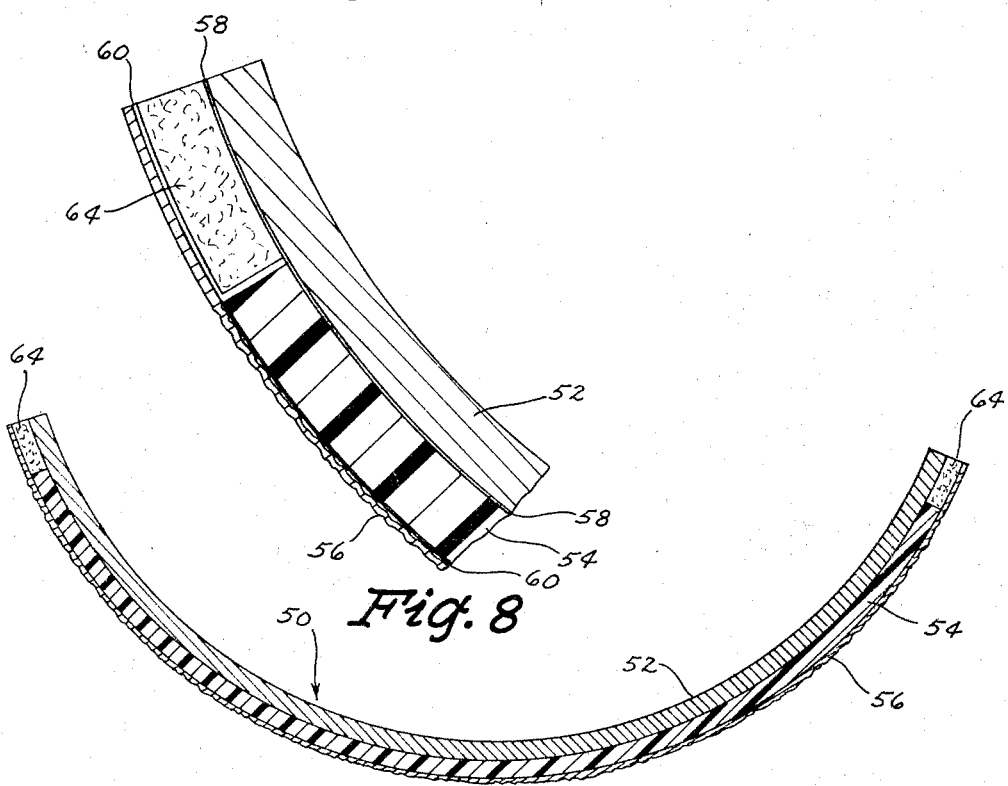
Fig. 8
Fig. 9

United States Patent Office 3,427,970
Patented Feb. 18, 1969

3,427,970
METHOD OF PRODUCING MOLDED PRINTING PLATES
Edward M. Redding, Algonquin, Ill., assignor to Printing Plate Supply Co., Chicago, Ill., a corporation of Illinois
Filed Sept. 19, 1966, Ser. No. 580,393
U.S. Cl. 101—401.1   12 Claims
Int. Cl. B41d 3/04

This invention relates to an improved printing plate assembly and the machine and method for making the printing plate.

A printing plate having a backing sheet of metal with a printing shell sandwiching therebetween a sheet of plastic frequently requires a boring operation after the assembly or sandwich has been completely assembled to give it the desired thickness uniformly throughout its area. This boring operation requires substantial time and the cost is considerable.

The method and machine of this invention will produce a printing plate which does not require boring and has a thickness within 0.001 inch of the desired thickness. This is accomplished by laminating the sandwich of materials in a die having solid half sections with die separation bearers which will successively permit the die sections to move closer together as the printing plate sandwich moves from the preheat stage to the molding stage and finally to the cooling stage of construction. The die halves of the cooling die in particular have guide members which rigidly control the movement of the dies back and forth to prevent any lateral movement therebetween and thus assist in producing a printing plate of uniform thickness. The pressure on the sandwich assembly is maintained during most of each cycle of operation since the thickness of the steel bearers, the temperature of the die and the die pressure are coordinated so that the steel bearers on one die half do not close against the opposite die half until nearly the end of the heating or chilling cycle. The minimizing of the period in which there is essentially no pressure on the printing plate sandwich minimizes the hot plastic tendency to flow and relieve itself of pressure which would cause a poor surface on the electrotype face and a variation in the printing plate thickness.

The backing plate of the printing plate sandwich may include yieldable gasket portions around the periphery formed of paperboard material which are spaced slightly from the edges of the plastic sheet material to provide for expansion of the plastic material upon being subjected to heat and pressure. A 1/16 inch gap has been found to be sufficient. Also, the juncture between the gasket portions at the four corners may include a passageway therebetween to permit outward flow of the excess plastic. A plastic of high flow rate properties particularly requires the use of the paperboard bearers to slow down the flow of the plastic around the edges or to drop the imposed pressure until the flow rate is observed to be satisfactory. A sandwich package which is considerably thicker than the desired finished printing plate, for example, 0.020 inch to 0.040 inch, requires that this equivalent volume of plastic must be forced out through the dams or passageways between the gasket portions or that the gasket portions themselves move as the hot plastic pushes against them.

As the printing plate package moves from the hot stations to the cold station, the preferred spacing between the die halves provided by the steel bearers is 0.010 inch greater than the exact thickness of the printing plate desired to the exact thickness of the plate desired in the cold sation.

These and other purposes of this invention will be apparent to those skilled in the art.

This invention also consists in the construction, arrangements, and combination of the various parts of the machine and plate assembly, whereby the objects contemplated are attained as hereinafter more fully set forth, specifically pointed out in the claims, and illustrated in the accompanying drawings in which:

FIG. 1 is a perspective view of the plate maker machine;

FIG. 2 is an end view of the machine in FIG. 1 as viewed from the right;

FIG. 3 is a perspective view of the movable die half;

FIG. 4 is a fragmentary cross-sectional view taken along line 4—4 in FIG. 2;

FIG. 5 is a fragmentary cross-sectional view similar to FIG. 4 but showing the printing plate package completed and still in the cooling die;

FIG. 6 is a perspective view of the completed printing plate assembly;

FIG. 7 is an enlarged perspective view of one corner of the printing plate of FIG. 6;

FIG. 8 is a fragmentary cross-sectional view of the assembled printing plate including the printing shell; and FIG. 9 is a cross-sectional view of a completed printing plate.

The printing plate forming machine of this invention is referred to generally in FIG. 1 by the reference numeral 10. It is provided with a supporting frame 12 having a preheating die 14, a molding die 16, and a cooling die 18. These dies are arranged in alignment such that a printing plate package may be placed in the preheat die 14 and moved by a cable or the like (not shown) successively through the dies towards the right end.

As shown in FIGS. 1 and 3, each of the dies include a movable upper die half 20 having a solid convex outer face 22. The upper die halves 20 are movably supported by two pairs of oppositely facing channel members 24. A pair of hydraulic cylinders 26 are connected to the channels 24 and to the die half 22 through the cylinder piston rods 28. The bottom half of each die is provided with a concave die half for matingly receiving the upper movable convex die half. In FIG. 2 it is seen that the cooling die 18 has a bottom stationary die 30 for receiving the movable upper die half 20.

The last operation performed on the printing plate package is the most critical and thus extra precaution has been taken to assure that there is no lateral movement of the movable die 20 as it moves towards and away from the bottom die half 30. Accordingly, three guide units 32 are provided on each side of the die to maintain the straight vertical movement of the movable die 20. The guide units 32 include a guide sleeve 34 secured to the side of the bottom die half 30 and a guide shaft 36 movably mounted in the sleeve 34 and rigidly connected to a laterally outwardly extending arm 38 connected to the upper movable die half 20.

As seen in FIG. 3, the die half 20 includes on its outer convex surface metal bearer limiting elements. These bearer elements are positioned at the peripheral edges of the convex surface and thus include two semi circular elements 40 at opposite ends of the movable die 20 and longitudinally extending bearer elements 42 positioned between the end elements 40 along the top edge of the die surface 22. The thickness of the bearer elements on the cooling die are substantially equal to the thickness of the desired completed printing plate while the thickness of the molding die bearer elements are relatively thicker and the preheat die bearer elements are additionally thicker. For example, a three die station machine may have a cold stage die with bearer elements having a thickness of 0.240 inch, molding stage die with bearer elements having a thickness of 0.255 inch and a preheat die bearer elements with a thickness of 0.270 inch. Stated another way, the molding die bearer elements are 6.25% larger than the cooling die bearer elements while the preheating die bearer elements are 12.50% thicker than the cooling die bearer elements.

In FIGS. 6, 7, 8 and 9 the printing plate assembly is shown in various stages of construction and is referred to in its completed form by the reference numeral 50 in FIG. 9. It includes a metal backing plate 52 having a sheet of plastic 54 such as vinyl chloride secured on its convex face and covered by a printing shell 56. These components are shown in FIG. 8 being secured together by adhesives 58 and 60. In FIG. 6 the backing plate 52 is provided with four paperboard gasket members 62 and 64 extending along the ends and longitudinal sides respectively. These paperboard gasket portions are thus integral with the backing plate 52 and function as a dam for the plastic material 54 when it is subjected to heat and pressure and begins to flow. When the printing plate package is considerably thicker than the desired finished printing plate, in the order of 0.020 inch to 0.040 inch it is necessary that there be a flow path or passageway through the gasket or dam portions and thus a flow path passageway 66 is provided at the juncture of the two gasket portions 64 and 62 in FIG. 7. Also, a gap of approximately 1/16 of an inch is provided between the peripheral edge of the plastic sheet 54 and the inside edge of the gasket portion 62 such that the plastic material may flow outwardly when being heated and compressed. It is contemplated that the paperboard gasket or dam portions will actually move slightly as the hot plastic pushes against them.

In operation, the printing plate package is placed between the die halves in the preheat die 14 which is at a temperature of 325° F. A pressure of two to three pounds per square inch is applied to the package for 4½ minutes. Next, the printing plate package is moved to the molding die 16 which is also set at 325° F. and is submitted to two to three pounds per square inch pressure for two and one-half minutes and then the pressure is increased to between 40 and 100 pounds per square inch during a time interval of one minute. Finally, the printing plate package is placed in the cooling die at 60° F. where it is subjected to 40 to 100 pounds per square inch pressure for four and one-half minutes. It is important to maintain pressure on the back of the printing plate during most of the cycle of each operation. In other words, the solid movable die head should not close on the steel bearers in the machine early in the heating or chilling cycle. It is necessary to avoid having a fairly long period in which there is essentially no pressure on the plate; otherwise, the hot plastic tends to flow and relieve itself of pressure, causing a poor surface on the electrotype face and variation in the thickness. Thus, the die should not bottom out before the last fifteen seconds of each operation. In the case of the three and one-half minute operation in the molding die, the die should not be bottomed out for over 7.12% of the operation time and in the four and one-half minute operation cycle the end of the cycle when the die is bottomed out should not exceed 5.54% of the operation time for that die. Thus, the die is bottomed out approximately between 5 and 7.5 percent of the period of each cycle. The temperatures in the heating stations while preferably are set at 325° they could vary from 300 to 350° depending on the conditions of operation and the temperatures in the cooling station could vary from 55 to 65 degrees.

The temperature of the dies may be maintained by placing hot oil therein (not shown). Also, the cooling may be accomplished by the use of a water circulation system which is also not shown.

Thus it is seen that through the use of the disclosed plate maker machine, printing plates having a very close thickness tolerance may be produced which do not require boring or shaving along the back side of the aluminum backing plate. It is possible to make these plates with a variation of no more than 0.001 inch thickness which is considerably better than can be accomplished with the use of a boring machine. It is important to have the precision bearers on the dies such that the exact thickness of the printing plate package is provided during each operation. These bearers also help position the movable heads within the lower stationary die halves. The use of the integral bearers with a provision for escape of fluid plastic insures containment of the hot plastic by giving it a place to go as the head comes down on the bearers. Consequently, this particular system produces a precision plate having a minimum of variation in thickness.

Some changes may be made in the construction and arrangement of my printing plate making machine and method of producing same without departing from the real spirit and purpose of my invention, and it is my intention to cover by my claims, any modified forms of structure or use of mechanical equivalents which may be reasonably included within their scope.

I claim:
1. The method of producing a molded printing plate, comprising,
  placing plate material including a layer of plastic between a first pair of closable dies, and closing and heating said dies to preheat said plastic layer under pressure for a first period of time,
  thence placing said plate material between a second pair of closable dies, and closing and heating said dies to mold said plastic layer during a second period of time, with the maximum pressure applied during said second period of time being greater than the pressure exerted during said first period of time,
  thence cooling said plate material by placing said plate material between a third pair of closable dies, and closing said dies for a third period of time at a temperature substantially lower than that applied during said second period of time,
  and controlling the minimum spacing between the dies of each pair of dies so that the minimum spacing of said dies of said first pair of dies during said first period of time is greater than the minimum spacing between said dies of said second pair of dies during said second period of time; and so that the minimum spacing between the dies of said second pair of dies during said second period of time is greater than the minimum spacing between said dies of said third pair of dies during said third period of time, each of said periods of time lasting several minutes and the length of time of minimum spacing not exceeding 15 seconds during at least said first and second periods of time.

2. The method of claim 1 wherein the length of time of minimum spacing of said dies of said respective pairs of dies occurs at the end of each respective period of time and is approximately 5 to 7.5 percent of the total time of each period of time.

3. The method of claim 1 wherein the minimum spacing of said dies of said respective pairs of dies occurs at the end of each respective period of time.

4. The method of claim 1 wherein the maximum temperature imposed on said plate making material during said first and second periods of time is between 300–350° F.

5. The method of claim 1 wherein the maximum temperature imposed on said plate material during said third period of time is between 55–65° F.

6. The method of claim 1 wherein the maximum pressure during the third period of time is between 40 and 100 p.s.i.

7. The method of claim 1 wherein the pressure during the first period of time is between 2 and 3 p.s.i., and the pressure during the last portion of the third period of time is between 40 and 100 p.s.i.

8. The method of claim 1 wherein said first and second periods of time are approximately 8 minutes, and said third period of time is approximately 4.5 minutes.

9. The method of claim 8 wherein during approximately the last minute of said second period, the pressure on said plate material is increased from between 2–3 p.s.i. to between 40–100 p.s.i.

10. The method of claim 1 wherein the maximum values of minimum spacing of dies of each respective pairs of dies during said corresponding three periods of time is such that the minimum spacing of said dies during said first period of time is 6.25% greater than during said second period of time and 12.5% greater than during said third period of time.

11. The method of claim 10 wherein the maximum temperature imposed on said plate material during said third period of time is between 55–65° F.

12. The method of claim 11 wherein the maximum pressure during the first period of time is approximately 2–3 p.s.i., and the maximum pressure during the second and third periods of time is approximately 40–100 p.s.i.

References Cited

UNITED STATES PATENTS

| | | | |
|---|---|---|---|
| 1,377,509 | 5/1921 | Novotny | 101—401.1 |
| 1,834,759 | 12/1931 | Baker | 101—401.2 |
| 2,075,507 | 3/1937 | Crowell | 101—401.2 |
| 2,075,636 | 3/1937 | Browne | 101—401.1 |
| 2,114,288 | 4/1938 | Davis | 101—401.1 |
| 2,800,856 | 7/1957 | Myers | 101—401.1 |
| 3,031,960 | 5/1962 | Bishop | 101—401.1 |
| 3,087,423 | 4/1963 | Libberton | 101—401.1 |
| 3,211,091 | 10/1965 | Garrett | 101—401.1 |
| 3,257,944 | 6/1966 | Gray | 101—401.1 |

DAVID KLEIN, *Primary Examiner.*